United States Patent [19]

Draper et al.

[11] Patent Number: 4,523,785

[45] Date of Patent: Jun. 18, 1985

[54] LATCH MECHANISM FOR HINGED PANELS

[75] Inventors: David L. Draper, Hamburg; Gerald D. McKee, Highland, both of Mich.

[73] Assignee: Cars & Concepts, Inc., Brighton, Mich.

[21] Appl. No.: 333,819

[22] Filed: Dec. 23, 1981

[51] Int. Cl.³ .............................................. B60J 7/18
[52] U.S. Cl. ...................................... 296/224; 16/330
[58] Field of Search ................ 296/216, 218, 224; 16/328, 329, 330, 331; 292/263, 277

[56] References Cited

U.S. PATENT DOCUMENTS

| | | | |
|---|---|---|---|
| 3,744,085 | 7/1973 | Griego | 16/330 |
| 3,874,029 | 4/1975 | McCullough | 16/329 |
| 3,974,753 | 8/1976 | Blomgren et al. | 296/218 |
| 4,005,901 | 2/1977 | Lutke et al. | 296/224 |
| 4,205,875 | 6/1980 | Smith | 296/218 |
| 4,364,600 | 12/1982 | Hauber | 296/218 |

Primary Examiner—Joseph F. Peters, Jr.
Assistant Examiner—Ross Weaver
Attorney, Agent, or Firm—Brooks & Kushman

[57] ABSTRACT

A latch mechanism for holding a hinged panel in open and closed position relative to a framed opening in a vehicle body having a handle and a link pivoted to each other and to the panel and the vehicle, respectively, so that in a closed position an overcenter position of the pivot points of the latch handle and link maintain the panel in a closed position and in which one of the pivot connections is formed by sliding a latch mechanism which permits the link and handle to be locked in selected relative positions to hold the panel in an intermediately opened position or a fully opened position.

3 Claims, 5 Drawing Figures

LATCH MECHANISM FOR HINGED PANELS

This invention relates to latch mechanisms for hinged panels and more particularly to a latch mechanism for sunroofs which permit holding the panel in a selected open position.

A variety of latch mechanisms for hinged panels for vehicles has been provided but for the most part they have the disadvantage of requiring more than one latch mechanism to achieve the desired clamping force or the latch mechanism protrudes into the passanger compartment to reduce head room which in many vehicles is already at a minimum. Also, most of the latch mechanisms permit positioning of the panel in only one of two positions, closed or open.

It is an object of the invention to provide a latch mechanism which overcomes the above-mentioned and other disadvantages.

Another object of the invention is to provide a latch for sunroofs which permits holding the roof in a selected open position.

The objects of the invention are accomplished by a latch mechanism having a handle pivotally connected to the panel at a first axis, a link pivotally connected to said frame at a second axis and lock means connecting the handle and link together at a third axis so that in a closed position of a panel the second axis is in an overcenter position relative to the first and third axes. A lock mechanism is incorporated at the third axis which permits locking the handle and link in selected positions relative to each other to maintain the panel in a selected open position.

These and other objects of the invention are accomplished by the embodiment disclosed in the following description and illustrated in the drawings in which.

Figure 1:
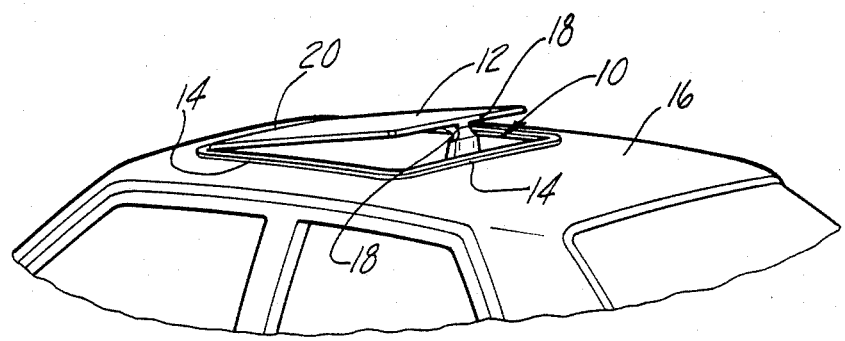
FIG. 1 is a perspective view of an upper portion of a vehicle having a sunroof and a latch mechanism embodying the invention.

The latch mechansim embodying the invention is designated generally at 10 and is for the purpose of closing a panel 12 such as a framed transparent panel of a sunroof relative to a frame 14 formed in the roof 16 of a vehicle. The latch 10 is disposed at the edge 18 of the panel 12 opposite to a detachably hinged edge 20. The latch 10 acts between the vehicle and panel to hold the panel in a closed position against seals 10 and 21 or in a partially opened position and is detachable to permit removal of the panel 12 from the frame 14.

Figure 2:
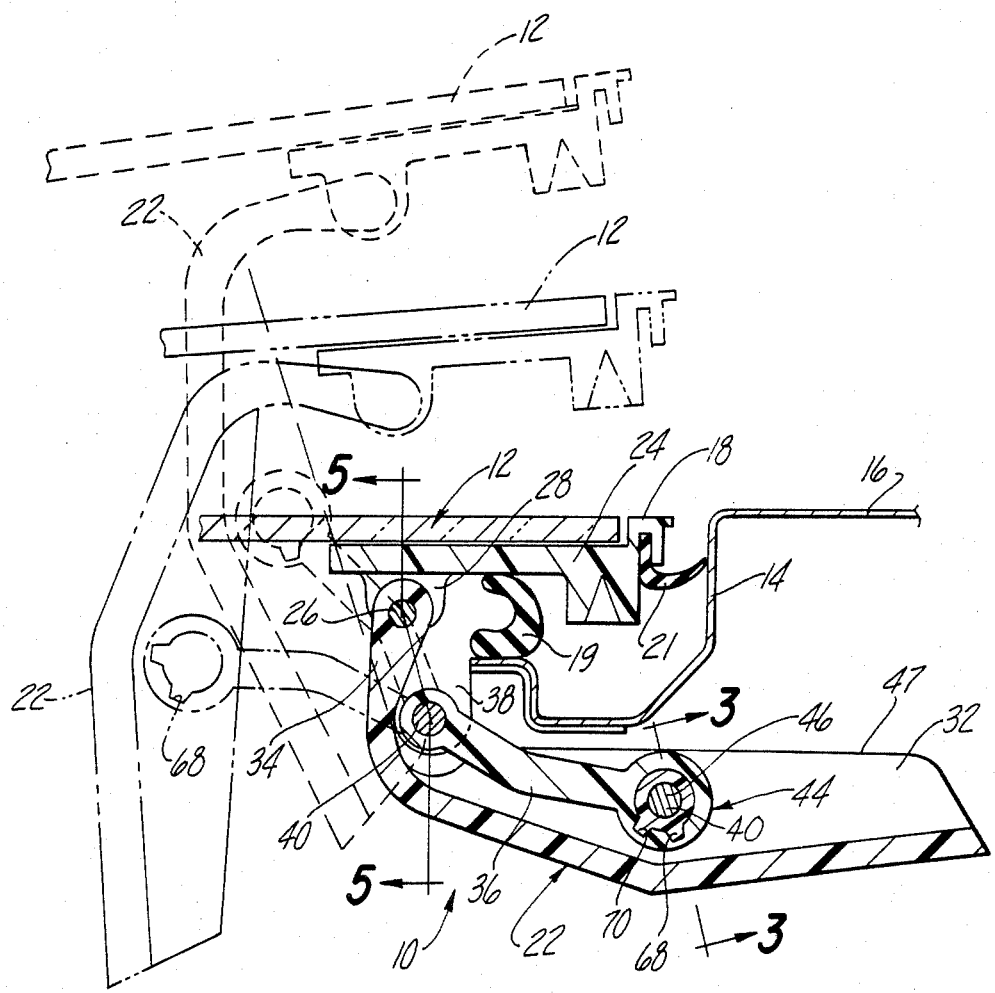
FIG. 2 is a cross-sectional view of the latch mechanism at a greatly enlarged scale.
Figure 3:
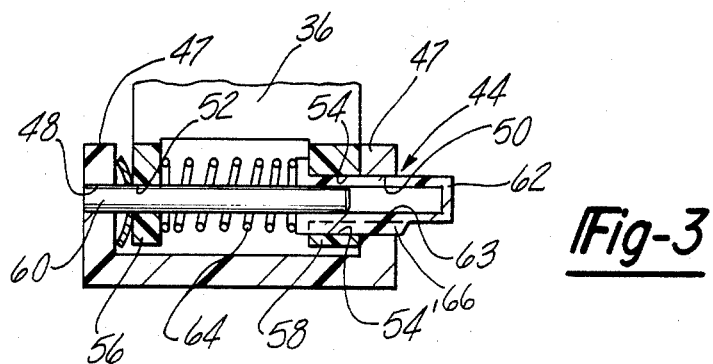
FIG. 3 is a cross-sectional view taken generally on line 3—3 in FIG. 2.
Figure 5:
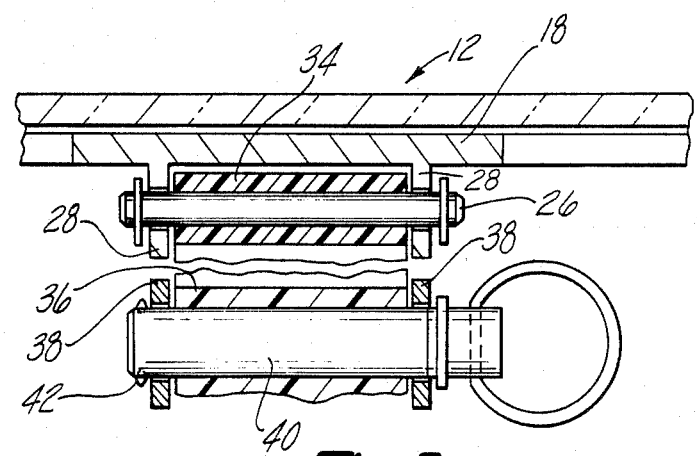
FIG. 5 is a cross-sectional view taken generally on the broken section line 5—5 in FIG. 2.

The latch mechanism 10 includes a handle 22 pivotally connected to the frame 24 of the panel 12 for pivotal movement about a pin 26 passing through ears 28 on the frame 24 of panel 12. The handle 22 has a generally elongated body 32 with a channel shaped cross-section as seen in FIG. 2 and an offset end 34 which receives the pin 26. The channel shaped body member 32 receives and houses a link 36 when the latch mechanism 10 is in its closed position. The link 36 is pivotally connected to a bracket 38 on the frame 14 by means of a quick release, detent pin 40 which is axially removable from the link 36 and bracket 38 upon overcoming the resistance of the spring loaded ball 42 seen in FIG. 5. The opposite end of the link 36 receives and forms part of a locking mechanism designated generally at 44 in FIGS. 2 and 3.

Figure 4:
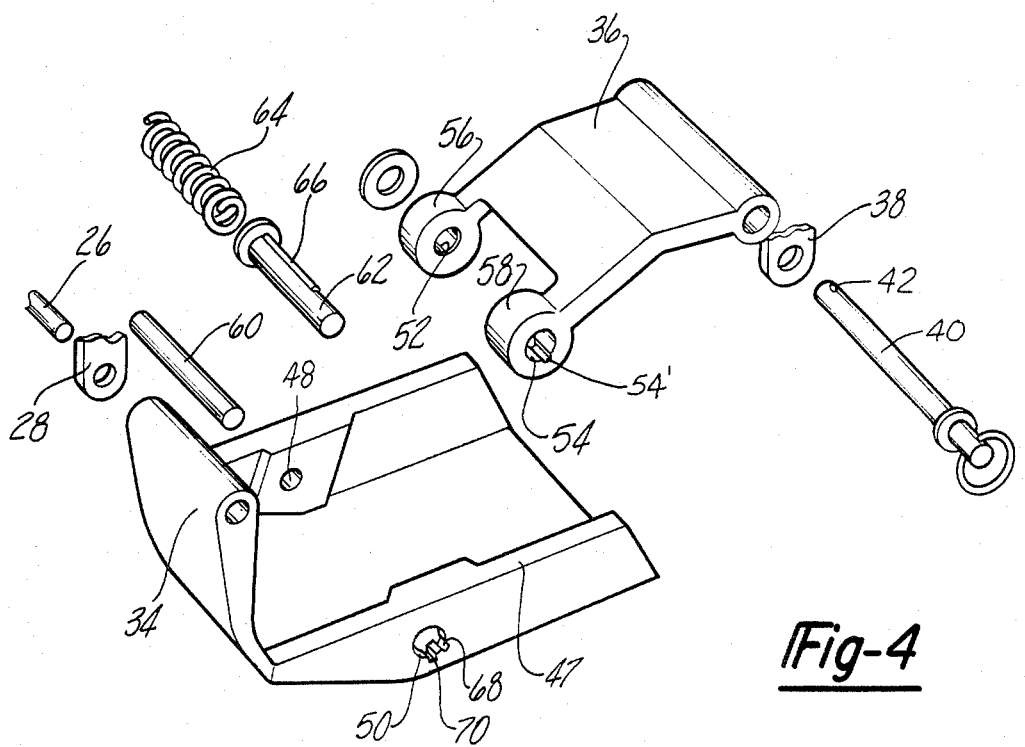
FIG. 4 is an exploded view showing the various components of the latch mechanism.

The locking mechanism 44 forms a pivot axis indicated at 46 between the handle 22 and one end of the link 36. More specifically, opposed flanges 47 of the handle 22 are provided with aligned openings 48 and 50 which are in alignment with openings 52 and 54, respectively, formed in an ear 56 and ear 58 at one end of the link 36. The smaller opening 48 of the handle 22 supports a pin 60 in a fixed position relative to the handle 22. The pin 60 extends through the opening 52 in the ear 56 and extends into the opening 54 in ear 58 of the link 36. The opening 54 of ear 58 has a groove 54' as shown in FIG. 4. The aligned opening 50 in the handle 22 and opening 54 in the link 36 support a slidable push button 62. The push button 62 has a blind bore 63 which receives the free end of the pin 60 so that the push button 62 may move axially of the pin 60 against the action of a coil spring 64 surrounding the pin 60. Opposite ends of the spring 64 are seated at one end on push button 62 and the inner surface of ear 56 of the link 36. The outer surface of the push button 62 is provided with a key portion 66 formed integrally with the push button which key portion is received in the groove 54' of ear 58 to prevent rotation of the push button 62 with respect to the ear 58. Key portion 66 of push button 62 is also received in a selected one of complementary grooves or keyways 68 or 70 formed in one side of the opening 50 in the flange 47 of the handle 22. Depression of the push button 62 axially inwardly against the action of the spring 64 displaces the key 66 from the keyway 68 or 70 and permits relative pivoting movement between the link 36 and handle 22. The pin 26 between the handle 22 and the panel 12 forms what may be considered a first pivot axis and the detent pin 40 between the bracket 38 and link 36 a second pivot axis. A third pivot axis is formed between the handle 22 and link 36 at axis 46.

In the closed position of the sunroof with the panel 12 in sealing engagement with the frame 14, the link 36 is housed by the channel shaped handle member 22 and as seen in FIG. 2, the arrangement of the various pivot axes is such that the second pivot axis at 40 is disposed in an overcenter position, that is, to one side of a line passing through the first and third axes at 26 and 46. In that position relative upward movement of the panel relative to the frame 14 is resisted. In that condition also, the push button will be depressed axially inwardly on the pin 60 against the action of the spring 64 with the end of the key 68 out of alignment with either groove 68 or 70 and held against an inner surface of the flange of the handle 22.

Unlatching and opening movement of the panel 12 requires swinging the handle 22 downwardly about pin 26 which brings the first, second and third pivot axes on line or on center with each other so that any subsequent downward pivoting of the handle 22 in the same direction disposes the second pivot axis or pin 40 to the opposite side of the line passing through the first and third pivot axes at 26 and 46 thereby releasing the latch mechanism 10. During such movement to the online or oncenter position, the panel 21 actually is moved into tighter closing engagement with the resilient seals on the frame 14.

After the handle 22 has been moved from its overcenter position, shown in full line in FIG. 2, the panel 12 is free to move upwardly about its hinged edge 20 until it reaches a partially open position at which time the key 66 will enter the keyway 68 under the action of the spring 64 preventing further relative movement of the link 36 and handle 22. Under this condition the panel 12 will be supported in a partially open position as illustrated in the intermediate phanthom line position in FIG. 2 with the hinged edge 20 remaining in closed position.

To move the panel 12 from its intermediate position in which the key 66 is in the keyway 68, the push button 62 which projects to one side of the handle 22 must be pushed against the action of the spring 64 to remove the key 66 from the keyway 68. Simultaneous upward pressure on the panel 12 or pivotal movement of the handle 22 permits further upward movement of the panel 12 and a release of the push button 62. In the released condition of the push button 62, the end of the key 66 will press against the inner surface of the flange of the handle 22 until the panel 12 reaches its fully open position shown in broken line in FIG. 2. At that time the key 66 will be urged into the keyway 70 under the action of the spring 64 and will prevent any further relative pivotal movement of the handle 22 and link 36. Under that condition the panel 12 will be in its fully opened, hinged position. At this point, if it is desired to remove the panel 12 from the frame 14, the detent pin 40 is moved axially against the action of the spring loaded ball 42 permitting removal of the pin and separation of the link 36 from its mounting bracket 38. The latch mechanism 10 remains with the panel 12 which can then be removed by detaching the hinged edge 20 of the panel 12.

With the hinged edge of the panel 12 connected to the frame 14 and with the panel in its fully open position, closing movement is attained by depressing the push button 62 while simultaneously allowing the panel to move downwardly until the panel swings towards a closed position in which the first, second and third pivots formed by pins 26, 40 and 46 are in line with each other. At this point the push button 62 can be released and will remain in its depressed condition due to the action of the end of the key 66 against the flange of the handle 22. Subsequently, the handle can be moved in a counterclockwise direction so that the pivot axis 46 passes overcenter, that is over the line passing through the first and second pivot axes at 26 and 46. This over-center action will cause the handle to move to the full line position shown in the drawings in which the panel 12 is fully closed on the frame 14 through means of the latch mechanism 10.

A latch mechanism has been provided which is particularly useful with pop-up sunroofs in which the latch mechansim acts to hold the sunroof panel in a fully locked position or which can be moved to selected opened positions in which the panel may be partially or fully opened.

The embodiments of the invention in which an exclusive property or privilege is claimed are defined as follows:

1. A latch mechanism for selectively holding a hinged panel in open and closed positions relative to an opening in a vehicle body comprising: a frame extending around the opening, a handle including a pair of flanges that form a cavity, one of said flanges including an opening, means connecting said handle to said panel for pivoting about a first pivot axis, a link, means connecting said link to said frame for pivotal movement about a second pivot axis, lockable means connecting said handle and said link together for relative pivotal movement about a third pivot axis between a closed position in which said first and second axes are adjacent to each other and an open position in which said first and second axes are spaced from each other, said lockable means including a push button mounted on said link for axial movement along the third axis without any rotation with respect to the link, complementary stop elements including a tongue on said push button and also including a groove on said handle adjacent the opening in the one flange thereof, said tongue and groove being engageable with each other to hold said handle and said link against relative rotation in order to hold said panel in the open position, said tongue and groove being disengaged from each other upon axial movement of the push button to permit rotation between the handle and the link about the third axis in order to permit relative movement of said panel between the open and closed positions, a pin that extends between the other flange of the handle and the push button to support the push button for the axial movement along the third axis, a spring that biases the push button axially along the third axis to engage the tongue on the push button with the groove in said one flange of the handle, and said cavity formed by the flanges of the handle receiving and housing the link when the latch mechanism positions the panel in the closed position.

2. The latch mechanism of claim 1 wherein said third axis is moveable to one side of a plane passing through said first and second pivot axes to pull said panel toward the closed position and resist opening movement of said panel, and said panel being moveable to the open position upon movement of said third axis to the other side of said plane.

3. The latch mechanism of claim 1 wherein said means connecting said link to said frame is a detent pin and wherein said detent pin is removable to separate said link and said frame in order to permit removal of the panel.

* * * * *